United States Patent [19]

Linde et al.

[11] Patent Number: 4,914,909
[45] Date of Patent: Apr. 10, 1990

[54] LOBED RING CONDITIONING ROLL

[75] Inventors: Gilbert W. Linde; Shaun A. Seymour, both of New Holland, Pa.

[73] Assignee: Ford New Holland, Inc., New Holland, Pa.

[21] Appl. No.: 324,792

[22] Filed: Mar. 17, 1989

[51] Int. Cl.⁴ .......................................... A01D 82/00
[52] U.S. Cl. ...................................... 56/1; 56/16.4; 56/DIG. 1
[58] Field of Search ....................... 56/1, 16.4, DIG. 1, 56/DIG. 2, DIG. 23; 100/70 A, 176; 34/127; 29/121.1, 121.2

[56] References Cited

U.S. PATENT DOCUMENTS

| | | | |
|---|---|---|---|
| 2,464,974 | 3/1949 | Garvey | 56/DIG. 1 |
| 3,043,073 | 7/1962 | Bornzin | 56/DIG. 1 |
| 3,488,929 | 1/1970 | Hale | 56/1 |
| 3,513,645 | 5/1970 | Garrett et al. | 56/1 |
| 3,712,034 | 1/1973 | Praca | 56/DIG. 1 |
| 3,854,974 | 12/1974 | Sato et al. | 100/176 |
| 3,890,770 | 6/1975 | Milliken | 56/DIG. 1 |
| 4,035,991 | 7/1977 | Oosterling et al. | 56/1 |
| 4,172,353 | 10/1979 | Meek et al. | 56/DIG. 1 |
| 4,216,641 | 8/1980 | Koch ét al. | 56/DIG. 1 |
| 4,446,678 | 5/1984 | Smith | 56/DIG. 1 |
| 4,472,927 | 9/1984 | Vogt et al. | 56/16.4 |
| 4,516,392 | 5/1985 | McLean et al. | 56/16.4 |

FOREIGN PATENT DOCUMENTS

| | | | |
|---|---|---|---|
| 1183297 | 12/1964 | Fed. Rep. of Germany | 56/DIG. 1 |
| 0217110 | 8/1968 | U.S.S.R. | 56/DIG. 1 |
| 0686661 | 10/1969 | U.S.S.R. | 56/DIG. 1 |

Primary Examiner—Stephen J. Novosad
Assistant Examiner—Terry L. Melius
Attorney, Agent, or Firm—Larry W. Miller; Frank A. Seemar; Darrell F. Marquette

[57] ABSTRACT

A conditioning roll for use in a conditioning mechanism on a hay harvesting machine is disclosed wherein the conditioning roll is formed by a plurality of axially stacked lobed rings movably mounted on a core member rotatably supported by the hay harvesting machine. Key members affixed to the core and engaged with slots in the lobed rings effect a rotation of the lobed rings with the core. An oscillating mechanism is operatively associated with the lobed rings to position the lobed rings in a plane non-perpendicular to the axis of rotation of the core. The oscillating mechanism effects an oscillating movement of the lobed rings during rotation of the core to provide a transverse movement of the outer peripheral surface of the lobed rings while in engagement with the crop material to effect a more aggressive conditioning thereof.

22 Claims, 5 Drawing Sheets

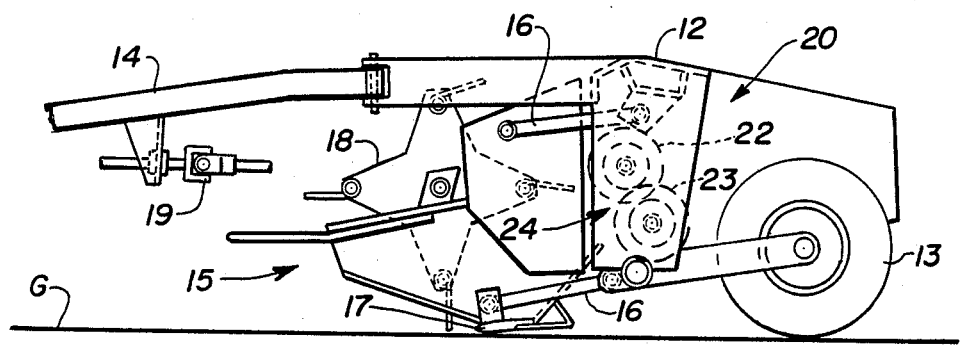
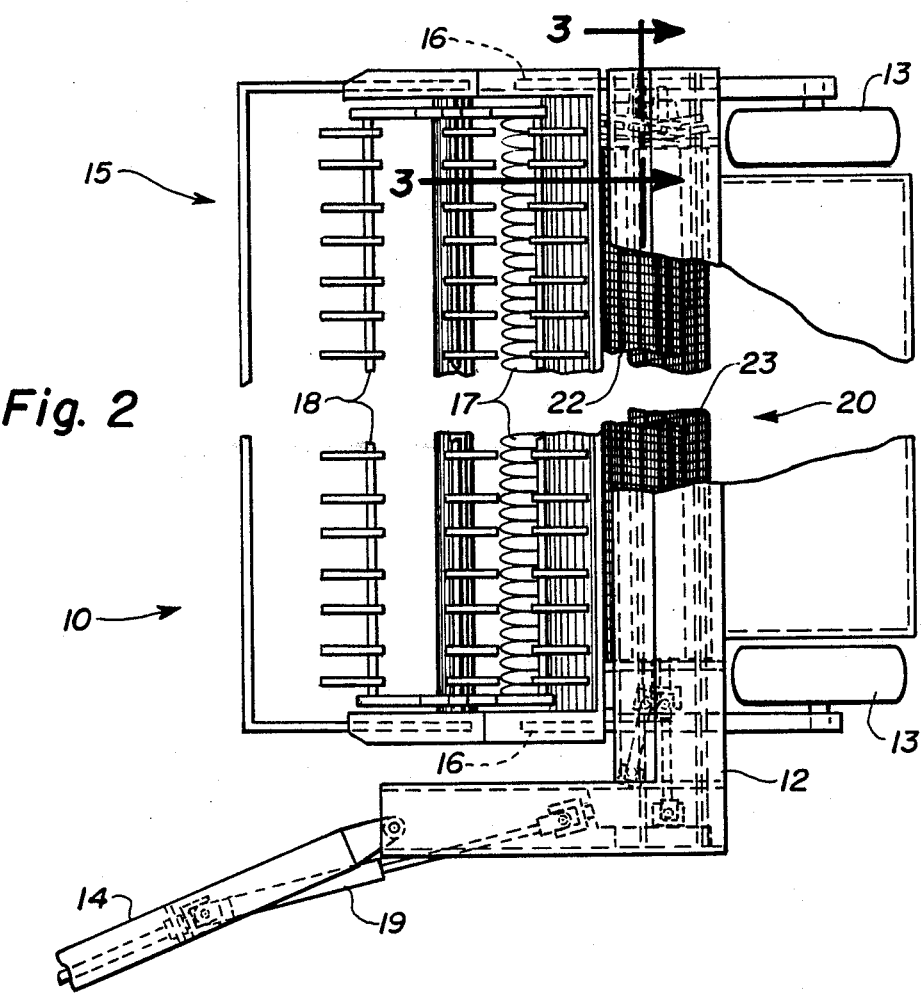

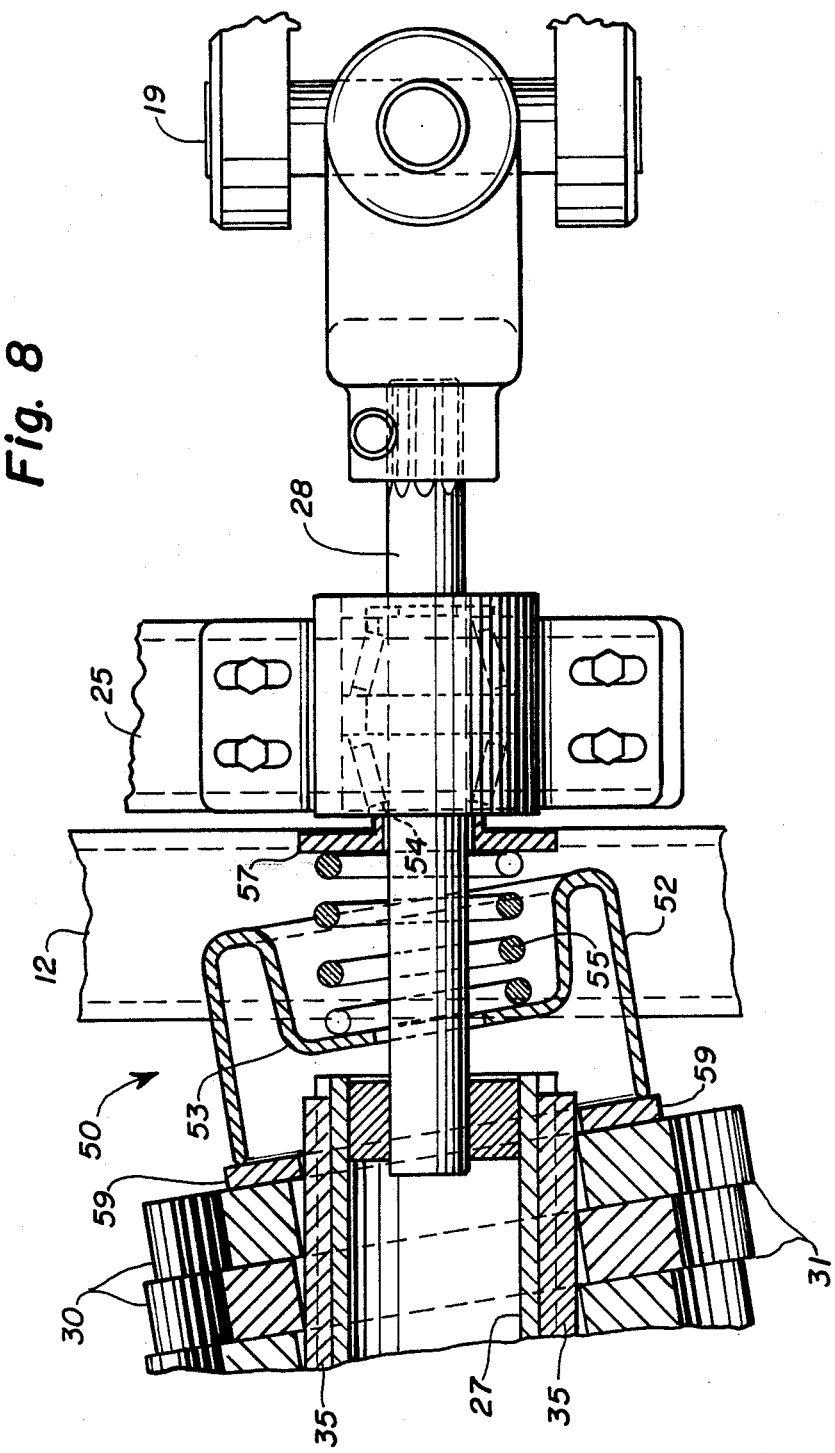

LOBED RING CONDITIONING ROLL

BACKGROUND OF THE INVENTION

This invention relates generally to hay harvesting machines and, more particularly, to a conditioning roll formed by a plurality of stacked lobed rings engageable with an oscillating mechanism to effect a more aggressive and extensive conditioning of the hay crop by combining traditional conditioning action with a transverse reciprocating lobe movement.

Hay harvesting machines commonly referred to as mower-conditioners or windrowers, utilize a crop harvesting header to sever the hay crop from the ground and convey it rearwardly to a conditioning mechanism operable to crush or crimp the severed crop material at spaced apart intervals along the stem of the crop to facilitate the drainage of liquids from the crop material plant. Conditioning mechanisms of the type utilizing a pair of counterrotating, intermeshing conditioning rolls are usually provided with transversely extending lugs or flutes to effect conditioning of the severed crop material in a manner described in greater detail in U.S. Pat. No. 3,488,929 issued to J. K. Hale.

Although the individual crop material plant, which generally has a waxy stem, has been broken in several places by the operation of the intermeshing flutes on the conditioning rolls, the liquids within the plant still require significant time to escape from the plant to permit satisfactory conditions under which the dried crop material can be baled and then removed from the field. A more rapid drying of liquids from the conditioned crop material could be obtained if the waxy stem of the crop material plant were split along the length thereof, providing a more accessible means for the liquid to escape from the plant.

Accordingly, it would be desireable to provide a conditioning mechanism that could provide a more aggressive and extensive conditioning of the harvested crop material to decrease the length of time required to lower the moisture content of the conditioned crop material so that the crop can be collected and removed from the field without the use of chemical treatment to accelerate the drying process.

SUMMARY OF THE INVENTION

It is an object of this invention to overcome the aforementioned disadvantages of the prior art by providing a conditioning roll formed by a plurality of stacked lobed rings mounted on a rotatable core for transverse lobe reciprocation.

It is another object of this invention to provide a conditioning roll capable of transverse reciprocal movement of the outer peripheral surface relative to the other conditioning roll in a crop conditioning mechanism having a pair of counterrotating conditioning rolls.

It is an advantage of this invention that superior conditioning of forage crops can be obtained.

It is a feature of this invention that the lobed rings are keyed to the rotatable core member so as to be rotatable therewith about an axis of rotation.

It is another feature of this invention that an oscillating mechanism is engageable with the lobed rings to oscillate the rings relative to the core during rotation thereof.

It is another advantage of this invention that the drying of a forage crop is hastened.

It is still another feature of this invention that the forage crop is subjected to two conditioning actions, one from the conventional crushing action of lobed intermeshing conditioning rolls and the other from a relative axial sliding action of the outer peripheral surfaces between the rolls while engaged with the forage crop.

It is yet another feature of this invention that the oscillating mechanism includes a biasing apparatus operable to maintain the lobed rings in a stacked configuration for simultaneous movement induced by the oscillating mechanism.

It is another feature of this invention that a wear plate is imposed between the oscillating mechanism and the lobed rings to minimize wear therebetween.

It is yet another advantage of this invention that the phasing of the transverse movement of the lobed rings can be selected to maximize conditioning of the forage crop for different orientations of counterrotating conditioning rolls.

It is a further object of this invention to provide a conditioning roll formed by a plurality of stacked lobed rings which is durable in construction, inexpensive of manufacture, carefree of maintenance, facile in assemblage, and simple and effective in use.

These and other objects, features, and advantages are accomplished according to the instant invention by providing a conditioning roll for use in a conditioning mechanism on a hay harvesting machine wherein the conditioning roll is formed by a plurality of axially stacked lobed rings movably mounted on a core member rotatably supported by the hay harvesting machine. Key members affixed to the core and engaged with slots in the lobed rings effect a rotation of the lobed rings with the core. An oscillating mechanism is operatively associated with the lobed rings to position the lobed rings in a plane nonperpendicular to the axis of rotation of the core. The oscillating mechanism effects an oscillating movement of the lobed rings during rotation of the core to provide a transverse movement of the outer peripheral surface of the lobed rings while in engagement with the crop material to effect a more aggressive conditioning thereof.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a side elevational view of the hay harvesting machine incorporating the principles of the instant invention;

FIG. 2 is a top plan view of the hay harvesting machine seen in FIG. 1 with a central portion thereof broken away for purposes of clarity;

FIG. 8 is a partial cross-sectional view of the opposing end of a conditioning roll corresponding to either FIG. 3 or FIG. 6 to depict the biasing apparatus forming a part of the oscillating mechanism shown in either FIG. 3 or FIG. 6.

DETAILED DESCRIPTION OF THE PREFERRED EMBODIMENT

Figure 3:
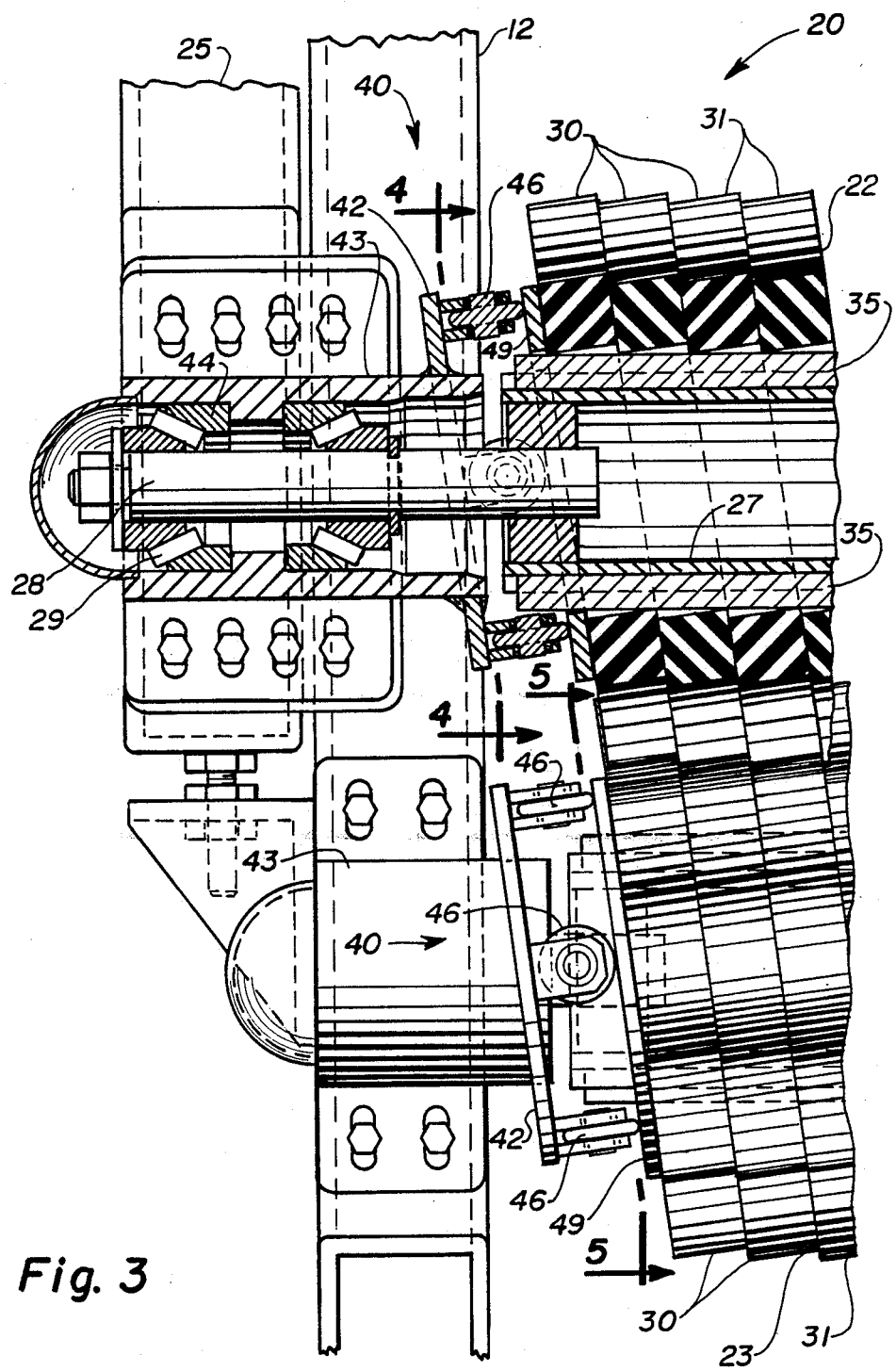
FIG. 3 is a partial cross-sectional view taken along lines 3—3 of FIG. 2 to depict the structural details of the conditioning roll and the oscillating mechanism engagement therewith.

Referring now to the drawings and, particularly, to FIGS. 1 and 2, a hay harvesting machine, commonly referred to as a pull-type mower conditioner, incorporating the principles of the instant invention can best be seen. Any left and right references are used as a matter of convenience and are determined by standing at the rear of the machine facing the forward end, the direction of travel.

The mower conditioner 10 is provided with a frame 12 adapted for movement over the ground G by wheels 13 rotatably mounted thereon. The frame 12 is provided with a pivotal drawbar 14 which extends forwardly therefrom for connection to a prime mover (not shown), such as a tractor, in a conventional manner. The frame 12 supports a header 15 by flotation linkage 16 for generally vertical movement relative to the ground G as is conventionally known. The header 15 includes a conventional cutterbar 17 operable to sever standing crop material from the ground G and a reel 18 rotatably operable in a conventional manner to convey the severed crop material rearwardly to the conditioning mechanism 20. The drive mechanism 19 is supported from the drawbar 14 and the frame 12 to transfer rotational power from the prime mover in a conventional manner to the operable components of the mower conditioner 10.

The conditioning mechanism 20 is shown mounted in the frame 12 rearwardly of the header 15 to receive severed crop material conveyed rearwardly therefrom by the reel 18. The conditioning mechanism 20 is provided with a rotatable upper roll 22 and a counterrotating lower roll 23 positioned for intermeshing engagement therewith to define a throat 24 into which the severed crop material is fed so as to pass between the counterrotating conditioning rolls 22, 23. Each conditioning roll 22, 23 is formed by a plurality of lobed rings 30 which will be described in greater detail below, providing an intermeshing configuration to crush the crop material passing longitudinally therebetween in a conventional manner.

Figure 6:
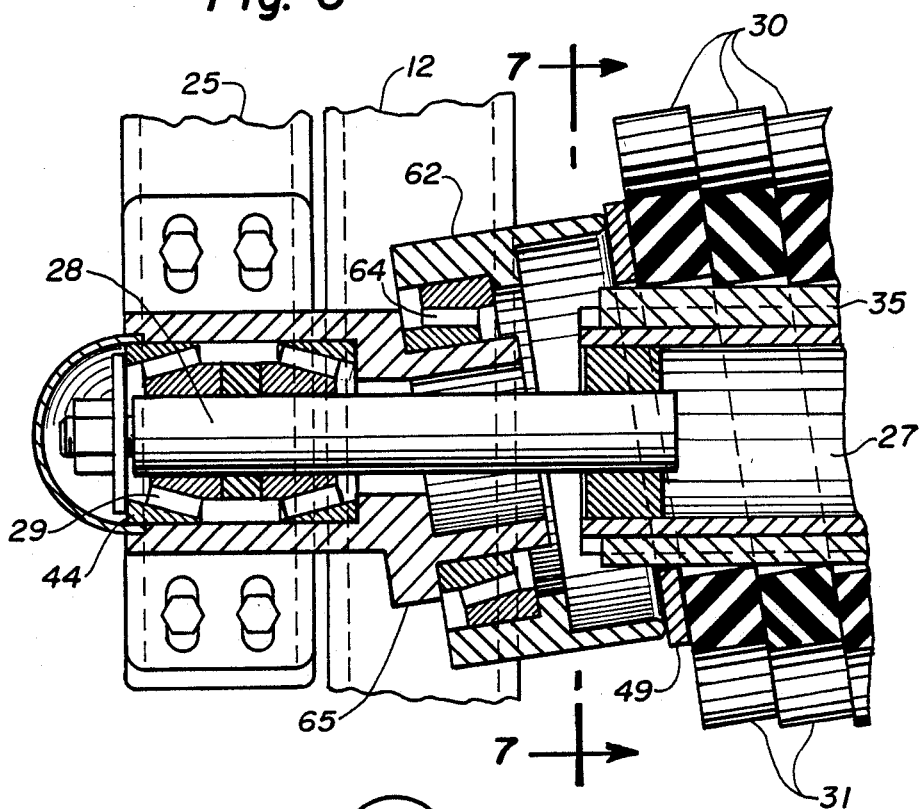
FIG. 6 is a partial cross-sectional view of one of the conditioning rolls similar to the view shown in FIG. 3, but utilizing an alternative embodiment of the oscillating mechanism.

Referring now to FIG. 3, the structural details of the conditioning rolls 22, 23 can best be seen. Each conditioning roll is preferably constructed identically; however, the principles of the instant invention would be equally applicable if only one of the conditioning rolls 22, 23 were constructed as described below while the opposing conditioning roll 22, 23 would be of a conventional fixed corresponding lobed configuration. Each conditioning roll 22, 23 is preferably constructed with a hollow core 27 having opposing outwardly extending jack shafts 28 rotatably journaled by bearings 29 so that the core 27 is rotatable about an axis of rotation defined by the shafts 28. As best shown in FIGS. 3 and 6, the upper roll 22 is preferably mounted on a conventional vertically movable lift arm 25 to permit relative vertical movement between the rolls 22, 23 to accommodate variable thicknesses of crop material between the rolls 22, 23. The rolls 22, 23 are driven in a timed relationship to maintain their intermeshing relationship.

Figure 4:
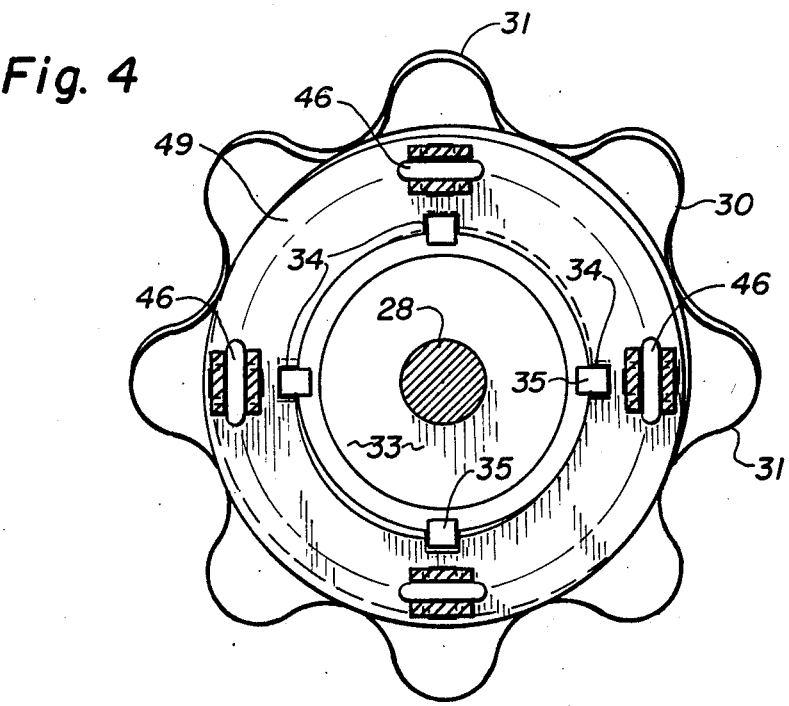
FIG. 4 is a cross-sectional view of the conditioning roll taken along lines 4—4 of FIG. 3 passing through the oscillating mechanism.
Figure 5:
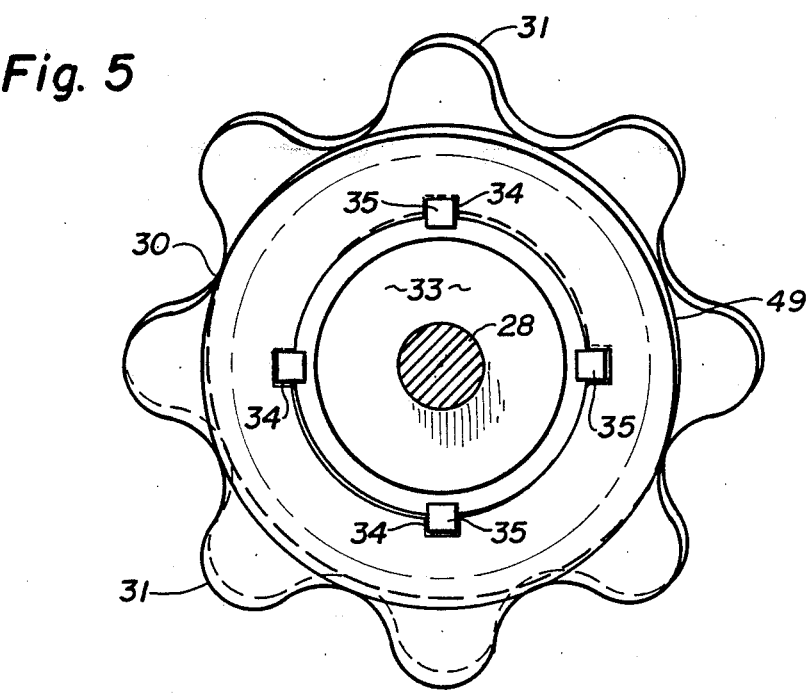
FIG. 5 is a cross-sectional view of the conditioning roll taken along lines 5—5 of FIG. 3 passing between the oscillating mechanism and the conditioning roll.

As can be seen in FIGS. 3-5, a plurality of lobed rings 30 are mounted on the core 27 in a stacked configuration. Each lobed ring 25 has a convoluted lobed outer peripheral surface 31 and a central opening 33 corresponding to the core 27. It can be seen that the central opening 33 includes a number of grooves 34 which are registerable with keys 35 fixed to the core member 27 so that a rotational movement of the core 27 will effect a corresponding rotation of the lobed rings 30. It should be noted that the relationship between the lobed rings 30 and the core 27 is not tight in that the lobed rings 30 must be free to wobble with respect to the core 27 as will be described in further detail below.

The conditioning rolls 22, 23 are also provided with an oscillating mechanism 40 which is operable to oscillate the lobed rings 30 relative to the core 27 such that the outer periphery 31 of the lobed rings 30 will be moved transversely, i.e. along the axis of rotation of the roll 22, 23 while in engagement with the forage crop in the throat 24 between the rolls 22, 23. Referring to FIGS. 3 and 4, it can be seen that the oscillating mechanism 40 is operable to position the lobed rings 30 in a canted plane extending non-perpendicularly to the axis of rotation defined by the jack shafts 28. The particular angle of the canted plane relative to the axis of rotation of the core 27 depends on the amount of transverse movement desired for the outer peripheral surface 31 of the lobed rings 30.

The oscillating mechanism 40 can be in the form of a canted member 42 fixed relative to the rotation of the core 27 such as being welded to the hub 43 supporting the outer race 44 of the bearings 29. The canted member 42 can be provided with a number of circumferentially spaced rollers 46 to facilitate the rotation of the lobed rings 30 relative to the canted member 42. A wear plate 49 can be positioned between the rollers 46 and the endmost lobed ring 30 to minimize the wear on the endmost lobed ring 30 due to engagement with the rollers 46 and/or the canted member 42. The primary purpose of this structure is to attain a relative opposing transverse movement between the two counterrotating conditioning rolls, preferably by causing the outer peripheral surfaces of the opposing rolls to move in opposite transverse directions while in engagement with the forage crop. Through this action, a more aggressive, extensive conditioning action can be obtained.

Referring now to FIG. 8, the opposing end of the respective conditioning rolls 22, 23 is representatively shown as including a biasing apparatus 50 to urge the plurality of stacked lobed rings 30 against the canted member 42 to maintain the lobed rings 30 in the canted plane. The biasing apparatus 50 can take the form of a second canted member 52 having a cupped portion 53 to receive a spring 55 compressed between the cupped portion 53 and a compression ring 57 engaged with the inner race 54 of the bearing 29 supporting the opposing jack shaft 28. As a result, the compression ring 57, spring 55, and second canted member 52 rotate with the core member 27 about the axis of rotation defined by the jack shaft 28. FIG. 8 also depicts a generally conventional drive mechanism 19 connected to the jack shaft 28 to effect rotation of the core member 27 and the use of a second wear plate 59 disclosed between the second canted member 52 and the endmost lobed ring 30 to minimize wear therebetween.

In operation, the lobed rings 30 are rotatable with the core member 27 about the axis of rotation defined by the jack shafts 28. Because the lobed rings 30 are disposed in the canted plane against the first canted member 42 by the operation of the biasing apparatus 50, the outer peripheral surface 31 of the lobed rings 30 will move transversely as they rotate around the jack shaft 28. The exact phasing of the transverse movements of the outer periphery 31 of the lobed rings 30 is dependent upon the relative orientation between the conditioning rolls 22, 23 and the amount of transverse movement desired in the throat 24 between the rolls 22, 23. The orientation of the first canted members 42 shown relative to the upper and lower rolls 22, 23 in FIG. 3 is meant to be representative only. If the rolls are oriented as shown in FIGS. 1 and 2 and the maximum transverse movement of the outer peripheral surface 31 of the lobed rings 30 is desired in the throat 24, the actual orientation of the first canted members 42 will not be identical to that shown in FIG. 3. In fact, both the phase and the slope of the plane of the first canted member for one of the rolls 22, 23 will be different than that shown for the other roll.

Figure 7:
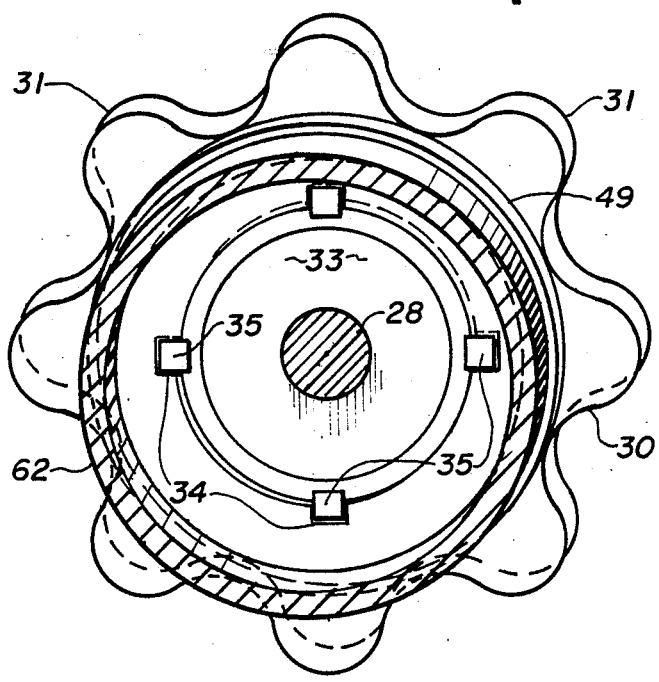
FIG. 7 is a cross-sectional view of the conditioning roll taken along lines 7—7 of FIG. 6 through the alternative oscillating mechanism.

Referring now to FIGS. 6 and 7, a different embodiment of the oscillating mechanism 40 can best be seen. The oscillating mechanism 40 includes a canted member 62 journaled by bearings 64 for rotation in a canted plane oriented non-perpendicularly with respect to the axis of rotation of the jack shaft 28. The bearing 64 is supported by a hub 65 which also supports the outer race 44 of the the bearing 29. The canted member 62 engages the lobed rings 30 through a wear plate 49 in the canted plane, as urged by the biasing apparatus 50 described above. Rather than accommodating the rotative movement of the lobed rings 30 by rollers 46 discussed above with respect to FIG. 3, the canted member 62 rotates with the lobed rings 30 in a fixed plane as accommodated by the bearings 64. The operation of the lobed rings 30 to effect a transverse movement of the outer peripheral surface 31 is essentially identical to that described above with respect to the embodiment shown in FIG. 3.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts as based upon the description may be employed in other embodiments without departing from the scope of the invention. Accordingly, the following claims are intended to protect the invention broadly as well as in the specific form shown.

Having thus described the invention, what is claimed is:

1. A conditioning mechanism operable in a crop harvesting machine to condition crop material fed thereto, comprising:
   a first conditioning roll having a core concentric about an axis of rotation and a plurality of lobed rings axially stacked on said core, each said lobed ring having an outer peripheral surface defining a multi-lobed circumferential configuration, said plurality of lobed rings being aligned on said core to define a multi-lobed conditioning roll, said lobed rings being mounted for oscillating movement relative to said core so that each said lobe moves between a first position and a second position axially displaced along said core from said first position as said lobes rotate around said axis of rotation;
   a second conditioning roll having an outer peripheral surface with a multi-lobed circumferential configuration similar to said first conditioning roll, said first and second conditioning rolls being rotatably mounted adjacent to one another such that said lobes are in intermeshing registry to condition crop material passing therebetween during rotation thereof;
   an oscillating mechanism operably engaged with said first conditioning roll to effect said oscillating movement of said lobed rings during rotation o said first conditioning roll so that the outer peripheral surface of each said lobed ring moves transversely relative to the outer peripheral surface of said second conditioning roll while in engagement with said crop material; and
   drive means operatively associated with said first and second conditioning rolls to effect a respective counter-rotation of said conditioning rolls.

2. The conditioning mechanism of claim 1 wherein said core is provided with keys registerable with corresponding key ways formed in said lobed rings to prevent rotation of said lobed rings around the circumference of said core.

3. The conditioning mechanism of said claim 2 wherein said oscillating mechanism includes a first canted member positioned in a canted plane oriented non-perpendicularly with respect to the axis of rotation of said first conditioning roll, said first canted member being engaged with said lobed rings to orient said lobed rings in said canted plane.

4. The conditioning mechanism of claim 3 wherein said oscillating mechanism further includes a second canted member oriented in said canted plane parallel to said first canted member, said first and second canted members being positioned at opposing ends of said first conditioning roll in engagement with said lobed rings.

5. The conditioning mechanism of claim 4 wherein said first canted member is fixed in said canted plane and is nonrotatable with respect to said first conditioning roll.

6. The conditioning mechanism of claim 5 wherein said first conditioning roll includes a wear plate mounted on said core for rotation therewith at each opposing end, said wear plate being positioned between said lobed rings and the respective said canted member.

7. The conditioning mechanism of claim 6 wherein said first canted member is provided with rollers engageable with the corresponding said wear plate to facilitate the rotative movement of said wear plate relative to said first canted member.

8. The conditioning mechanism of claim 4 wherein said second canted member includes a biasing means axially urging said second canted member toward said first canted member.

9. The conditioning mechanism of claim 8 wherein both said first and second canted members are provided with rollers operably engageable with said lobed rings to facilitate relative movement between said canted members and said lobed rings.

10. The conditioning mechanism of claim 8 wherein said biasing means includes a spring mounted around a support shaft coinciding with said axis of rotation of said first conditioning roll, said second canted member including a cupped portion receiving said spring and being operable to exert the biasing force from said spring to said lobed rings to position said lobed rings in said canted plane against said second canted member.

11. The conditioning mechanism of claim 10 wherein said spring is compressed between the cupped portion of said second canted member and a compression ring mounted for rotation with said first conditioning roll so that said second canted member, said spring and said compression ring are rotatable with said first conditioning roll.

12. The conditioning mechanism of claim 4 wherein said first canted member is journaled for rotation about a second axis perpendicular to said canted plane while in engagement with said lobed rings rotatable with said core about said axis of rotation of said first conditioning roll, whereby said lobed rings are oscillated between said first and second positions during each revolution of said core.

13. A conditioning roll for use in a conditioning mechanism of a crop harvesting machine having a drive means operably connected to said conditioning roll to effect rotation thereof, comprising:
  an elongated core having opposing support shafts affixed thereto and journaled for rotative movement about an axis of rotation corresponding to said support shafts, said core having an outer circumferential surface, said shafts being operatively associated with said drive means to effect rotation of said core;
  a plurality of planar ring member having an outer peripheral surface and being mounted on the outer circumferential surface of said core in a stacked configuration for rotation therewith, said ring members being movable relative to said core between first and second slanted positions so that said ring members move transversely, generally parallel to said axis of rotation while being rotated with said core and while being in engagement with crop material fed through said crop harvesting machine;
  an oscillating mechanism operatively associated with said ring member to effect said movement thereof so that any given point on the outer peripheral surface of each said ring member moves between first and second axially displaced positions while said conditioning roll is being rotated; and
  transfer means interconnecting said core and said ring members to transfer rotational movement from said core to said ring members so that said ring members are rotatable with said core, said transfer means permitting said ring members to move between said first and second position while being rotated with said core.

14. The conditioning roll of claim 13 wherein said ring members have a convoluted outer peripheral surface forming transversely extending lobes when aligned on said core.

15. The conditioning roll of claim 14 wherein said transfer means is a key affixed to said core and extending radially outwardly from the outer circumferential surface of said core, said key being engageable with a corresponding slot formed in said ring members.

16. The conditioning roll of claim 15 further comprising a wear plate engageably positioned between the endmost said ring member and said oscillating mechanism and being engaged by said oscillating mechanism while effecting movement of said ring members between said first and second positions to minimize wear on said endmost ring member.

17. The conditioning roll of claim 16 wherein said oscillating mechanism includes a canted member fixed relative to the rotation of said conditioning roll and angled in a canted plane oriented in a non-perpendicular orientation with respect to said axis of rotation, said canted member being engaged with said wear plate and operable to orient said ring members in said canted plane so that rotation of said ring members about said axis of rotation effects said transverse movement of the outer peripheral surface of said ring members.

18. The conditioning roll of claim 17 wherein said canted member is provided with rollers engageable with said wear plate to minimize wear therebetween.

19. The conditioning roll of claim 18 wherein said oscillating mechanism further includes a biasing apparatus positioned in operative engagement with said ring members at the opposing end of said conditioning roll from said canted member, said biasing member being operable to urge said ring members into said canted plane against said canted member.

20. The conditioning roll of claim 14 wherein said oscillating member includes a canted member mounted for rotation in a canted plane oriented in a non-perpendicular orientation with respect to said axis of rotation, said canted member being in operative engagement with said ring members to position said ring members in said canted plane so that rotation of said ring members about said axis of rotation effects said transverse movement of the outer peripheral surface of said ring members.

21. The conditioning roll of claim 20 wherein said oscillating mechanism further includes a biasing apparatus positioned in operative engagement with said ring members at the opposing end of said conditioning roll from said canted member, said biasing member being operable to urge said ring members into said canted plane against said canted member.

22. The conditioning roll of claim 21 wherein wear plates are positioned between said ring members and, respectively, said canted member and said biasing apparatus, said ring members being engageable with a key affixed to said core to force rotation of said ring members with said core.

* * * * *